US008516383B2

(12) United States Patent
Bryant et al.

(10) Patent No.: US 8,516,383 B2
(45) Date of Patent: Aug. 20, 2013

(54) SYSTEM AND METHOD FOR DEVELOPING ANIMATED VISUALIZATION INTERFACES

(75) Inventors: Mark Bryant, Fountain Valley, CA (US); Michael Haedrich, Munich (DE); Rashesh Mody, San Clemente, CA (US); Scott Clark, Cottles Bridge (AU)

(73) Assignee: Invensys Systems, Inc., Foxboro, MA (US)

( * ) Notice: Subject to any disclaimer, the term of this patent is extended or adjusted under 35 U.S.C. 154(b) by 2199 days.

(21) Appl. No.: 11/130,728

(22) Filed: May 17, 2005

(65) Prior Publication Data
US 2005/0257204 A1 Nov. 17, 2005

Related U.S. Application Data

(60) Provisional application No. 60/571,833, filed on May 17, 2004.

(51) Int. Cl.
*G06F 3/048* (2006.01)
(52) U.S. Cl.
USPC ............ 715/763; 715/762; 715/771; 715/821
(58) Field of Classification Search
USPC ................ 717/115; 715/762, 771, 772, 821, 715/970, 763
See application file for complete search history.

(56) References Cited

U.S. PATENT DOCUMENTS

| | | | |
|---|---|---|---|
| 5,664,208 A | | 9/1997 | Pavley et al. |
| 5,737,622 A | | 4/1998 | Rogers et al. |
| 5,883,639 A | * | 3/1999 | Walton et al. ................. 345/473 |
| 5,917,730 A | * | 6/1999 | Rittie et al. ....................... 703/6 |
| 6,222,537 B1 | * | 4/2001 | Smith et al. ................... 715/762 |
| 6,362,839 B1 | * | 3/2002 | Hamilton et al. ............. 715/764 |
| 6,489,971 B1 | * | 12/2002 | Miller et al. .................. 715/763 |
| 6,556,219 B1 | * | 4/2003 | Wugofski ..................... 715/762 |
| 6,662,236 B1 | * | 12/2003 | Chen et al. .................... 719/320 |
| 7,007,266 B1 | * | 2/2006 | Isaacson ....................... 717/100 |
| 7,086,009 B2 | * | 8/2006 | Resnick et al. ................ 715/771 |
| 7,134,085 B2 | * | 11/2006 | Austin .......................... 715/763 |
| 7,287,230 B2 | * | 10/2007 | Austin et al. .................. 715/763 |
| 2002/0198920 A1 | | 12/2002 | Resnick et al. |
| 2003/0058280 A1 | * | 3/2003 | Molinari et al. .............. 345/771 |
| 2004/0230911 A1 | * | 11/2004 | Bent et al. ..................... 715/762 |
| 2005/0071769 A1 | * | 3/2005 | Suzuki et al. ................. 715/762 |
| 2005/0096872 A1 | | 5/2005 | Blevins et al. |
| 2005/0262107 A1 | * | 11/2005 | Bergstraesser et al. ....... 707/100 |

OTHER PUBLICATIONS

Gammon Nick, MUSHclient scripting, Jan. 18, 2003, http://web.archive.org (WaybackMachine).*

(Continued)

*Primary Examiner* — Nicholas Ulrich
(74) *Attorney, Agent, or Firm* — Edward S. Jarmolowicz

(57) ABSTRACT

A system and method are described for designing animated visualization interfaces depicting, at a supervisory level, manufacturing and process control information wherein graphical symbols in the visualization interfaces are associated with components of a process control/manufacturing information application. The system includes a graphical symbol library for maintaining a set of graphical symbol templates wherein the graphical symbol templates including a graphics definition including graphics and a reference to an application component type. The reference facilitates identifying candidate application components for creating an association between a graphical symbol instance created from a graphical symbol template and one of the candidate application components. The system also includes a graphical symbol design environment for selecting the graphical symbol template, specifying an application component corresponding to the component type, and creating an association between the graphical symbol instance and the specified application component.

28 Claims, 9 Drawing Sheets

(56) References Cited

OTHER PUBLICATIONS

Szekely Pedro, Template-Based Mapping of Application Data to Interactive Displays, 1990, ACM.*

International Search Report dated Nov. 21, 2006.

Written Opinion of the International Searching Authority dated Nov. 21, 2006.

Supplementary European Search Report for EP 05750937 dated Mar. 29, 2010.

* cited by examiner

SYSTEM AND METHOD FOR DEVELOPING ANIMATED VISUALIZATION INTERFACES

CROSS REFERENCE TO RELATED APPLICATION

This application claims priority of Bryant et al. U.S. Provisional Application Ser. No. 60/571,833 filed on May 17, 2004, the contents of which are expressly incorporated herein by reference in their entirety including the contents and teachings of any references contained therein.

TECHNICAL FIELD

The present invention generally relates to facilities for developing visualization interfaces, and, more particularly, to software-based systems facilitating, via interface symbol creation/editing tools, building animated visualization graphical interface applications. Such visualization applications generally comprise a set of windows including sets of animated graphical symbols representing the operational status of a set of data sources. Animating the graphical symbols is driven by, for example, a steam of real-time values provided by process control/manufacturing information data sources linked to graphical display characteristics of the graphical symbols. Such real-time information is typically rendered and stored in the context of supervising automated industrial processes.

BACKGROUND

Industry increasingly depends upon highly automated data acquisition and control systems to ensure that industrial processes are run efficiently, safely and reliably while lowering their overall production costs. Data acquisition begins when a number of sensors measure aspects of an industrial process and periodically report their measurements back to a data collection and control system. Such measurements come in a wide variety of forms. By way of example the measurements produced by a sensor/recorder include: a temperature, a pressure, a pH, a mass/volume flow of material, a tallied inventory of packages waiting in a shipping line, or a photograph of a room in a factory. Often sophisticated process management and control software examines the incoming data, produces status reports, and, in many cases, responds by sending commands to actuators/controllers that adjust the operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial actions such as move equipment into and out of service as required.

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. When multiplied by thousands of sensors/control elements, this results in so much data flowing into the process control system that sophisticated data management and process visualization techniques are required.

Highly advanced human-machine interface/process visualization systems exist today that are linked to data sources such as the above-described sensors and controllers. Such systems acquire and digest (e.g., filter) the process data described above. The digested process data in-turn drives a graphical display rendered by a human machine interface. An example of such system is the well-known Wonderware INTOUCH® human-machine interface (HMI) software system for visualizing and controlling a wide variety of industrial processes. An INTOUCH HMI process visualization application includes a set of graphical views of a particular process. Each view, in turn, comprises one or more graphical elements. The graphical elements are "animated" in the sense that their display state changes over time in response to associated/linked data sources. For example, a view of a refining process potentially includes a tank graphical element. The tank graphical element has a visual indicator showing the level of a liquid contained within the tank, and the level indicator of the graphical element rises and falls in response to a steam of data supplied by a tank level sensor indicative of the liquid level within the tank. Animated graphical images driven by constantly changing process data values within data streams, of which the tank level indicator is only one example, are considerably easier for a human observer to comprehend than a steam of numbers. For this reason process visualization systems, such as INTOUCH, have become essential components of supervisory process control and manufacturing information systems.

Management of supervisory process control visualization applications based upon the aforementioned visualization systems can be a monumental task. Configuring such applications includes specifying graphical/animated images within a graphical interface window and linking such images to data sources. A number of tools significantly reduce the effort involved in producing such interfaces. For example, bitmaps and animation scripts that drive view/appearance characteristics of a depicted graphical element are provided by graphical element vendors and maintained within a graphical element library. Developers of particular visualization applications, through known HMI configuration tools (e.g., Wonderware's Window Maker utility within the INTOUCH software suite) need only specify a set of graphical elements (copied from a graphical element library) and their associated links to data sources. Such tools are of substantial value to HMI process visualization application developers. In fact these useful development aids facilitates application developers creating extensive, elaborate, and complex user interfaces comprising large numbers of animated graphical elements. However, keeping track of all the various graphical elements and their associated data sources within a complex application can be overwhelming.

SUMMARY OF THE INVENTION

The present invention addresses the potential need to provide better ways of designing and maintaining supervisory process control visualization applications. In particular, the present invention provides a highly integrated system for maintaining graphical elements and their associated underlying data sources in a process control visualization application environment.

The above advantages are facilitated by a system and method for designing animated visualization interfaces depicting, at a supervisory level, manufacturing and process control information wherein graphical symbols in the visualization interfaces are associated with components of a process control/manufacturing information application. The system includes a graphical symbol library for maintaining a set of graphical symbol templates. The graphical symbol templates each include a graphics definition. The graphics definition includes graphics data for generating a graphical symbol. The graphics definition also includes a reference to an application component type. The reference (e.g., an application object template reference) facilitates identifying candidate application components for creating an association between a graphical symbol instance created from a graphical symbol template and one of the candidate application components. By way of example, the reference enables a search utility to review a set of available application objects and thereafter present them to a visualization interface developer (who selects one or, alternatively, creates a new application object from an appropriate application component template).

The system also includes a graphical symbol design environment including a visualization interface design tool. The visualization interface design tool facilitates designating the graphical symbol template, from the graphical symbol library, from which the graphical symbol instance is created, and specifying an application component corresponding to the reference to an application component type. Thereafter, an association is created between the graphical symbol instance and the specified application component, wherein the association facilitates providing data from the application component for driving an animation characteristic of the graphical symbol instance.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 5 is flowchart summarizing a set of stages associated with graphical symbol templates and instances created there from;

DETAILED DESCRIPTION OF THE DRAWINGS

The following description is based on embodiments of the invention and should not be taken as limiting the invention with regard to alternative embodiments that are not explicitly described herein.

By way of example, the present invention is incorporated within a supervisory process control and manufacturing information environment wherein individual data sources are represented by application objects. An example of such system is described in detail in Resnick et al., U.S. application Ser. No. 10/179,668, filed on Jun. 24, 2002, for SUPERVISORY PROCESS CONTROL AND MANUFACTURING INFORMATION SYSTEM APPLICATION HAVING A LAYERED ARCHITECTURE, the contents of which are incorporated herein by reference in their entirety including the contents and teachings of any references identified/contained therein. However, as those skilled in the art will appreciate in view of the disclosed exemplary embodiments, the present invention is potentially applicable to a variety of alternative supervisory process control environments that include identifiable data sources that provide real-time process data that drives a set of dynamic graphical elements representing at least a portion of an observed/controlled industrial process.

Figure 1:
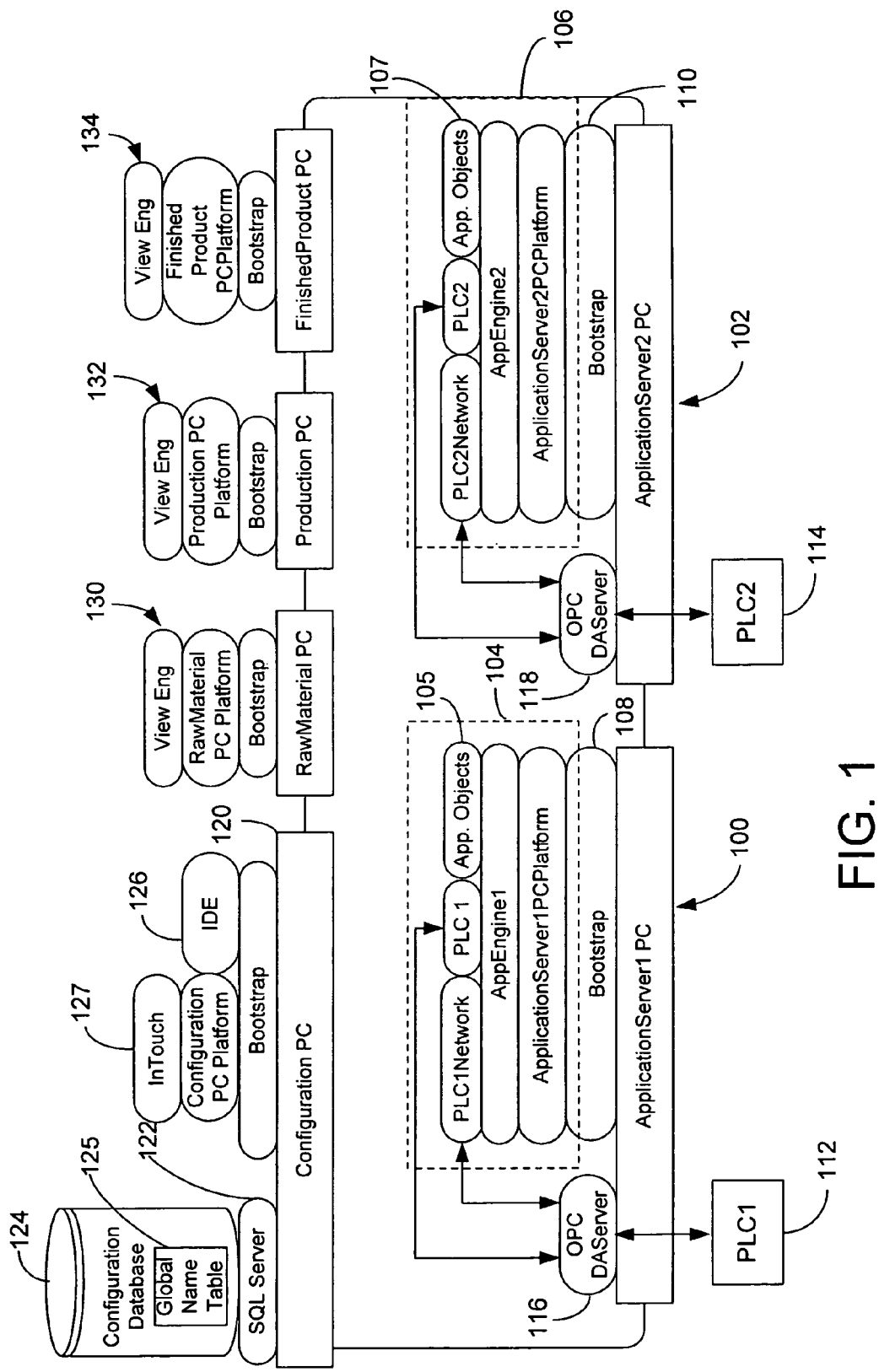
FIG. 1 is a schematic diagram depicting the hosting/hierarchical relationships of components within an exemplary supervisory process control network including a multi-layered supervisory process control and manufacturing information system.

Referring to FIG. 1, a schematic diagram depicts the hosting/hierarchical relationships of components within an exemplary supervisory process control network including a multi-layered supervisory process control and manufacturing information system installed upon a set of networked computing machines (PCs). Before going into a more detailed description of the exemplary network environment it is generally noted that, in this embodiment, data sources are presented, by way of example, in the form of application objects 105 and application objects 107 that receive status information. Furthermore, the application objects 105 and 107 are identified within a global name table 125 maintained by a configuration database 124 (E.g., Wonderware's Galaxy Repository)—the contents of which are made available to a developer via a visualization application development tool 127 (e.g., Wonderware's INTOUCH software) executing on a configuration PC 120. The visualization application development tool 127, in an embodiment of the present invention, submits queries for particular information residing within the configuration database 124 to facilitate presenting available data sources (e.g., application objects 105 and application objects 107) incorporated by a developer into one or more process visualization view/windows for a particular application (e.g., a manufacturing process line). Once built, the process visualization application is potentially executed upon any one of a set of workstations connected to the supervisory process control network schematically depicted in FIG. 1. In an embodiment of the invention the above-described visualization application is executed as one or more application objects hosted by a view engine, which is in turn supported by a platform running on a supervisory node.

With continued reference to FIG. 1, a first application server personal computer (PC) 100 and a second application server PC 102 collectively and cooperatively execute a distributed multi-layered supervisory process control and manufacturing information application comprising a first portion 104 and second portion 106. The application portions 104 and 106 include device integration application objects PLC1Network and PLC1, and PLC2Network and PLC2, respectively. The PLCxNetwork device integration objects facilitate configuration of a data access server (e.g., OPC DAServers 116 and 118). The PLC1 and PLC2 device integration objects, operating as OPC clients, access data locations within the buffers of the OPC DAServers 116 and 118. The data access servers 116 and 118 and the device integration objects cooperatively import and buffer data from external process control components such as PLCs or other field devices. The data buffers are accessed by a variety of application objects 105 and 107 executing upon the personal computers 100 and 102. Examples of application objects include, by way of example, discrete devices, analog devices, field references, etc.

In accordance with an embodiment of the present invention, application engines host the application objects (via a logical grouping object referred to herein as an "area"). The engines are in turn hosted by platform objects at the next lower level of the supervisory process control and manufacturing information application. The application portions 104 and 106 are, in turn hosted by generic bootstrap components 108 and 110. All of the aforementioned components are described herein below with reference to FIG. 2.

In the exemplary system embodying the present invention, the multi-layered application comprising portions 104 and 106 is communicatively linked to a controlled process. In particular, the first application server personal computer 100 is communicatively coupled to a first programmable logic controller 112, and the second application server personal computer 102 is communicatively coupled to a second programmable logic controller 114. It is noted that the depicted connections from the PCs 100 and 102 to the PLCs 112 and 114 represent logical connections. Such logical connections correspond to both direct and indirect physical communication links. For example, in a particular embodiment, the PLC 112 and PLC 114 comprise nodes on an Ethernet LAN to which the personal computers 100 and 104 are also connected. In other embodiments, the PLCs 112 and 114 are linked directly to physical communication ports on the PCs 100 and 102.

In the illustrative embodiment set forth in FIG. 1, the PCs 100 and 102 execute data access servers 116 and 118 respectively. The data access servers 116 and 118 obtain/extract process information provided by the PLC's 112 and 114 and provide the process information to application objects (e.g., PLC1Network, PLC1, PLC2Network, PLC2) of the application comprising portions 104 and 106. The data access servers 116 and 118 are, by way of example, OPC Servers. However, those skilled in the art will readily appreciate the wide variety of custom and standardized data formats/protocols that are potentially carried out by the data access servers 116 and 118. Furthermore, the exemplary application objects, through connections to the data access servers 116 and 118, represent a PLC network and the operation of the PLC itself. However, the application objects comprise a virtually limitless spectrum of classes of executable objects that perform desired supervisory control and data acquisition/integration functions in the context of the supervisory process control and manufacturing information application.

The supervisory process control and management information application is augmented, for example, by a configuration personal computer 120 that executes a database (e.g., SQL) server 122 that maintains a supervisory process control and management information application configuration database 124 for the application objects and other related information including templates from which the application objects are instantiated. The configuration database 124 also includes a global name table 125 that facilitates binding location independent object names to location-derived handles facilitating routing messages between objects within the system depicted in FIG. 1. The configuration PC 120 and associated database server 122 support: administrative monitoring for a multi-user environment, revision history management, centralized license management, centralized object deployment including deployment and installation of new objects and their associated software, maintenance of the global name table 125, and importing/exporting object templates and instances.

Configuration of the application objects, the sources of the data provided to the visualization applications, is carried out via an Integrated Development Environment (IDE) 126. However, as will be explained further herein below, such configuration of application objects is potentially carried out, at least in part, in association with the visualization application development tool 127 that communicates with the database server 122 via distributed component object model (DCOM) protocols. The IDE 126 is a utility (comprising potentially multiple components) from which application objects are defined, created and deployed to a variety of platforms/engines including, for example, the application server PCs 100 and 102. In the case of the process visualization applications, the application objects are potentially deployed to other PCs that carry out a workstation role. Developers of a supervisory process control and manufacturing information application, through the IDE 126, carry out a wide variety of system design functions including: importing new object and template types, configuring new templates from existing templates, defining new application objects and deploying the application objects to the host application engines (AppEngine1 or AppEngine2 in FIG. 1) on the application server PCs 100 and 102.

The exemplary supervisory control network environment depicted in FIG. 1 also includes a set of operator stations 130, 132, and 134 that provide a view into a process or portion thereof, monitored/controlled by the supervisory process control and management information application installed and executing as a set of layered objects upon the PCs 100 and 102. A RawMaterial PC 130 provides a representative view enabling monitoring a raw materials area of a supervised industrial process. A ProductionPC 132 presents a representative view of a production portion of the supervised industrial process. A FinishedProductPC 134 provides a representative view of an area of a production facility associated with finished product. Each one of the operator stations 130, 132, and 134 includes a bootstrap host for each of the particular operator station platforms. Each one of the operator stations 130, 132, and 134 includes a view engine that supports visualization application objects for processing data provided by other application objects/data sources to render a graphical depiction of the observed industrial process or portion thereof. By way of further example, each of the operator stations 130, 132 and 134 run view applications through INTOUCH and INTOUCH View software installed on the operator stations. Such software corresponds to the view engines and application objects referred to herein above. The data driving animated behavior associated with symbols depicted in a view is either accessed locally or updated via any suitable network application development mechanism.

It is noted that the system depicted in FIG. 1 and described hereinabove is merely an example of a multi-layered hierarchical architecture for a supervisory process control and manufacturing information system. The present invention is not limited to the particular disclosed application/system, and in fact, need not be implemented in the form of a multileveled application as shown in the illustrative example. It is further noted that FIG. 1 is presented as a logical view of the hosting interrelations between installed software and physical computing hardware and is not intended to designate any particular network topology. Rather the present invention is suitable for virtually any network topology. In fact, the present invention is applicable to a system wherein both configuration utility and supervisory process control visualization applications run on a single computer system linked to a controlled process.

Figure 2:
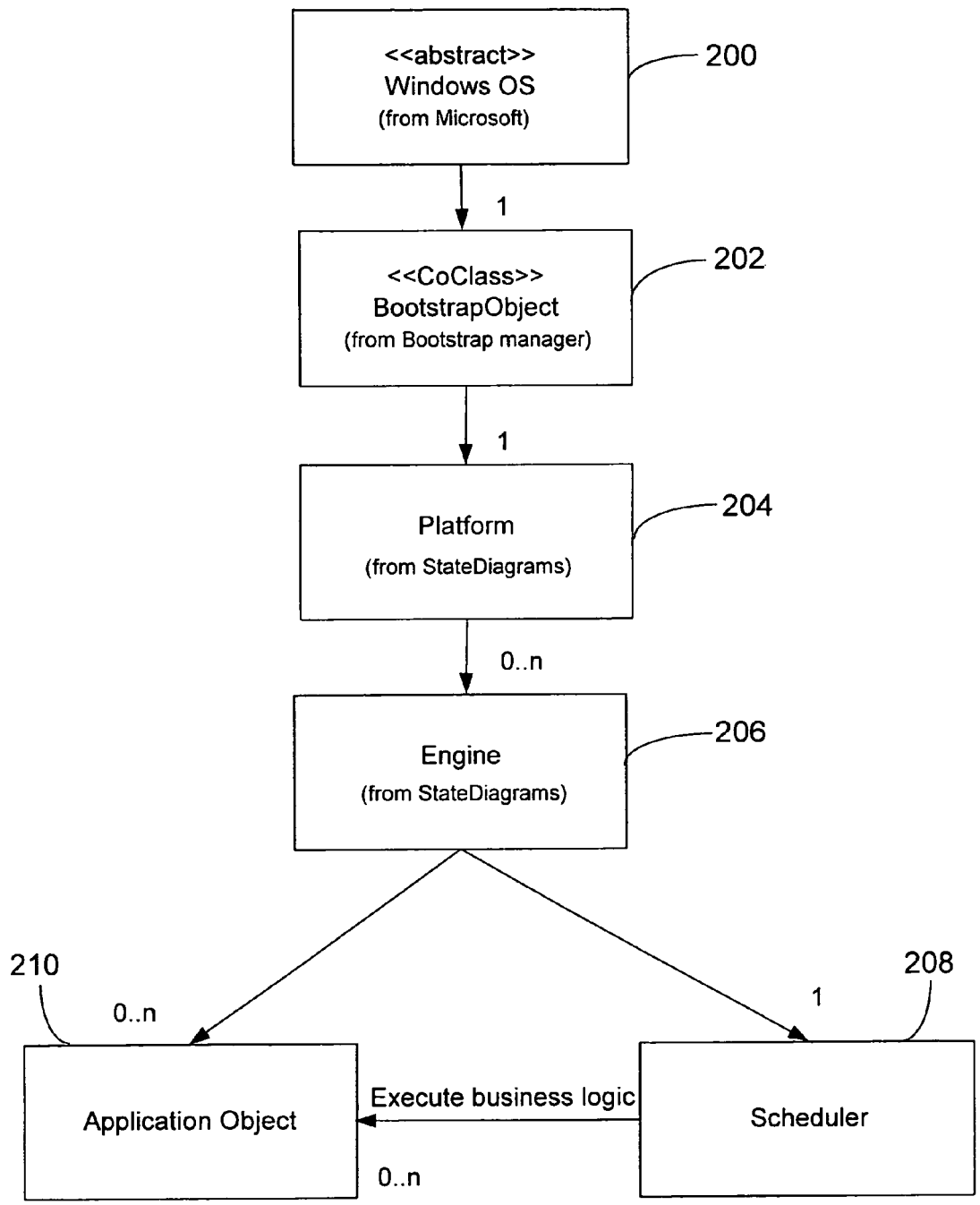
FIG. 2 depicts a multi-tiered object hosting arrangement for hosting applications on platforms and engines within an exemplary system embodying the present invention.

Turning to FIG. 2, a class diagram depicts the hierarchical hosting arrangement of layered software associated with a computer (e.g., PCs 100 or 102) executing at least a portion of a supervisory process control and manufacturing information application. Each computer executes an operating system 200, such as MICROSOFT's WINDOWS at a lowest level of the hierarchy. The operating system 200, hosts a bootstrap object 202. The bootstrap object 202 is loaded onto a computer and activated in association with startup procedures executed by the operating system 200. As the host of a platform class object 204, the bootstrap object 202 must be activated before initiating operation of the platform class object 204. The bootstrap object 202 starts and stops the platform class object 204. The bootstrap object 202 also renders services utilized by the platform class object 204 to start and stop one or more engine objects 206 hosted by the platform class object 204.

The platform class object 204 is host to one or more engine objects 206. In an embodiment of the invention, the platform class object 204 represents, to the one or more engine objects 206, a computer executing a particular operating system. The platform class object 204 maintains a list of the engine objects 206 deployed on the platform class object 204, starts and stops the engine objects 206, and restarts the engine objects 206 if they crash. The platform class object 204 monitors the running state of the engine objects 206 and publishes the state information to clients. The platform class object 204 includes a system management console diagnostic utility that enables performing diagnostic and administrative tasks on the computer system executing the platform class object 204. The platform class object 204 also provides alarms to a distributed alarm subsystem.

The engine objects 206 host a set of application objects 210 that implement supervisory process control and/or manufacturing information acquisition functions associated with an application. The engine objects 206 initiate startup of all application objects 210. The engine objects 206 also schedule execution of the application objects 210 with regard to one another with the help of a scheduler object 208. Engine objects 206 register application objects 210 with the scheduler object 208 for execution. The scheduler object 208 executes application objects relative to other application objects based upon a configuration specified by a corresponding one of the engine objects 206. The engine objects 206 monitor the operation of the application objects 210 and place malfunctioning ones in a quarantined state. Furthermore, engine objects 206 support check pointing by saving/restoring changes to a runtime application made by automation objects to a configuration file. The engine objects 206 maintain a name binding service that binds attribute references (e.g., tank1.value.pv) to a proper one of the application objects 210.

The engine objects 206 ultimately control how execution of associated ones of the application objects 210 will occur. However, once the engine objects 206 determine execution scheduling for application objects 210, the real-time scheduling of their execution is controlled by the scheduler 208.

The scheduler 208 supports an interface containing the methods RegisterAutomationObject( ) and UnregisterAutomationObject( ) enabling engine objects 206 to add/remove particular ones of the application objects to/from the scheduler 208's list of scheduled operations.

The application objects 210 include a wide variety of objects that execute business logic facilitating carrying out a particular process control operation (e.g., turning a pump on, actuating a valve), and/or information gathering/management function (e.g., raising an alarm based upon a received field device output signal value) in the context of, for example, an industrial process control system. Examples of process control (automation) application objects include: analog input, discrete device, and PID loop. A class of the application objects 210, act upon data supplied by process control systems, such as PLCs, via device integration objects (e.g., OPC DAServer 118). The function of the integration objects is to provide a bridge between process control/manufacturing information sources and the supervisory process control and manufacturing information application.

The application objects 210, in an exemplary embodiment, include an application interface accessed by the engine objects 206 and the scheduler 208. The engine objects 206 access the application object interface to: initialize an application object, startup an application object, and shutdown an application object. The scheduler uses the application object interface to initiate a scheduled execution of the application object.

Having described the primary components of an exemplary supervisory process control and manufacturing information network environment, attention is directed to an exemplary system embodying the present invention that includes software for developing and deploying visualization applications for use in such environments to monitor process control elements within such environments via a human-machine interface (HMI). The visualization applications support/facilitate supervisory process management and control through a variety of graphical displays depicting industrial processes (or portions thereof). An example of such a system is Wonderware's INTOUCH HMI software executed on the configuration computer 120.

Figure 3:
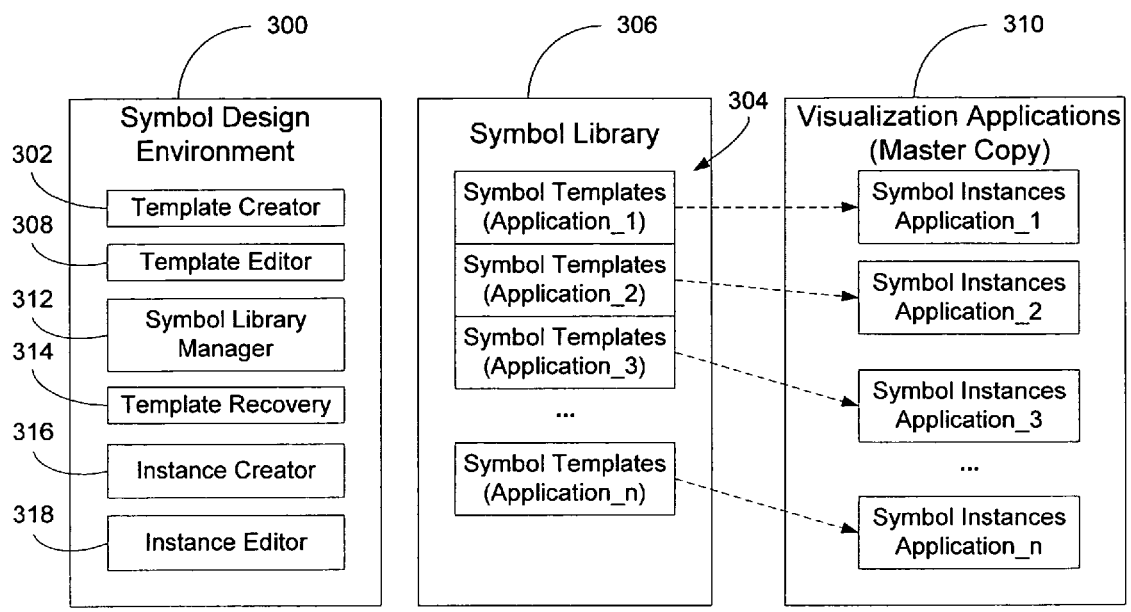
FIG. 3 is a schematic diagram of an exemplary visualization application design environment embodying the present invention.

Referring to FIG. 3, an exemplary process control visualization application development environment embodying the present invention comprises a number of highly integrated components. These components facilitate creating, editing and deploying process control and manufacturing information visualization applications comprising a collection of graphical symbol instances created from graphical symbol templates. The graphical symbol instances generally contain one or more changeable display characteristics driven by real-time data provided by components of a process monitoring and control system. The components are, for example, application objects, and local and remote tagged data references. In an embodiment of the invention, dynamic display characteristics of graphical symbol instances are governed by real-time values provided by components linked to the graphical symbol instances.

The present invention is carried out via any of a variety of known computer system hardware and software arrangements. Development/configuration of graphical symbol templates and visualization applications incorporating symbol instances created from the symbol templates can take place on any of a variety of computing devices (both networked and standalone). Thereafter the visualization applications link real-time process data to graphical symbols presented on a user interface of a variety of networked devices. Such networked devices include, for example, workstations, tablet PCs, hand-held personal computers. Furthermore, such networked devices are connected to the real-time information sources, which drive the graphical symbols' dynamic appearance, via a variety of network communication media, including hard-wired and wireless links. Furthermore, the networks themselves can embody any of a variety of topologies.

The exemplary visualization application development environment includes a symbol design/development environment 300. The symbol design/development environment 300 comprises a set of tools/utilities, including graphical user interface-based browsers and dialog boxes, that facilitate creating and modifying graphical symbol templates and instances having links to application objects and tagged data sources in a process control and manufacturing information system. The symbol design/development environment 300 includes a symbol template creation tool 302 that facilitates creating symbol templates 304. The template creation tool 302 initially prompts a user to select a data source link type (e.g., an application object, a local tag, a remote tag, etc.). In the case where an application object link is selected, a list of object templates (determining the type of graphical symbol template) are presented. The process of creating a new symbol template is described further herein below.

Symbol Template Library

In an exemplary process control visualization interface design environment embodying the present invention, the symbol templates 304 are stored within a symbol library 306. As indicated by a set of individual boxes representing each of a set of "n" visualization applications, the symbol library 306 is arranged/segmented such that a separate container is provided for each of "n" visualization applications. Thus, in an embodiment of the present invention, each visualization application comprises, among other things, a set of symbol templates and a set of associated symbol instances created from the set of symbol templates.

Editing Symbol Templates

A symbol template editor tool 308 facilitates modifying a symbol template (for an application) previously stored within the symbol template library 306. In an exemplary embodiment, a developer selects an "edit" mode of the symbol template design environment 300 and selects a symbol template to invoke the template editor tool 308. The user thereafter makes desired changes to the selected symbol template. Such changes include any changes to a template in an edit mode such as changes to graphics (e.g., changing the size, shape, or other attributes of one or more graphical primitives or cells, or adding or removing some primitives or cells) or changes to any animation expressions incorporated within the graphical primitives. Prior to making such edits, the cell representing the entire symbol is broken to make the changes to elements of the cell (the parent symbol cell is thereafter re-built). The developer then saves the modified symbol template within its application-specific container in the symbol template library 306.

The aforementioned association between a parent symbol template and child symbol instances (created from the template) is maintained during the life of the visualization application such that changes (carried out via the symbol template editor 308) to a symbol template are propagated to all child symbol instances of the parent template within a visualization application. A symbol manager 312 (described further herein below) maintains a table containing a list, for each symbol template, of corresponding views/applications containing related/child symbol instances. In particular, upon committing the edits to a symbol template (and storing the new version of the symbol template in an appropriate container in the symbol template library 306), the editor tool 308 initiates propagating the symbol template changes to a set of symbol instances presently associated with (e.g., previously created from) the modified symbol template within an application. Designers of visualization applications are able to make changes to a set of symbol instances, created from a same symbol template, through an update mechanism that automatically propagates symbol template modifications to the set of symbol instances. The ability to propagate such changes throughout a visualization application (comprising potentially many visualization windows) enables a developer to update a set of graphical symbol instances created from a single parent symbol template through a single editing session on the parent symbol template.

By way of a particular example, changes are propagated locally by opening a local file identifying each symbol instance corresponding to a changed symbol template and updating the portion of the local file containing the affected symbol instances. If the affected symbol instances are contained within process visualization applications running on non-local nodes, then the task of updating the non-local symbol instances is handled by network application development utilities/features. Such development utilities/features modify the affected windows/views (i.e., those containing changed symbol instances) locally and then deploy the modified windows/views as replacements to corresponding non-local visualization interface applications. Such changes are made by either publishing the changes to a set of subscribers or, alternatively, on demand for an update from a non-local client.

Deploying Visualization Applications

Once created, visualization applications are deployed to, and thereafter executed upon, an HMI host (e.g., a workstation) node. In an embodiment of the invention, a deployment utility transfers a copy of a selected application to a designated destination HMI host node. During deployment, the visualization applications (including their associated graphical symbol templates and instances) are potentially replicated to multiple nodes on a network. In such cases, a master copy of each visualization application is maintained by a application server 310 and copies of the visualization application are transmitted to, and locally stored/executed upon, a set of distributed client nodes operating as supervisory process control and manufacturing information workstations. Furthermore, the aforementioned modifications to a symbol template are propagated from a master copy of the visualization application (including symbol instances created from associated from symbol templates), stored on the application server 310, to all copies of the particular visualization application distributed throughout a network. In an exemplary embodiment, only changed portions of a visualization application, to the extent they are separable from unchanged components, are transmitted to the client nodes.

Conversely, in regard to propagating changes to symbol templates, associations between templates and instances do not cross visualization application boundaries. Constraining the associations, and thus the propagation scope of changes, to a particular application enables supervisory process control visualization designers to modify a previously stored symbol template, and the change is only propagated to all instances of the changed symbol template within the single visualization application—but will not be picked up by other applications. Thus, a change to a graphical symbol template in a particular application has no effect on graphical symbols outside that particular application.

It is noted that the propagation boundaries, imposed at applications in the exemplary embodiment, can be imposed at a variety of alternative levels (logical groupings) in accordance with various embodiments of the invention. For example, the scope is potentially further limited to a single window or, alternatively, expanded to a set of logically grouped applications (e.g., a process, a plant, an organization, etc.).

Turning to the arrangement of symbol templates within an application-specific container, in an embodiment of the invention each of the application-specific symbol template containers comprises a hierarchically arranged set of folders containing either symbol templates or other folders. This hierarchical relationship of folders within the template containers is depicted in a template directory pane 600 in a symbol template selection window depicted in FIG. 6. The template selection window is presented, for example, when a user seeks to create a symbol instance in the context of a visualization application development tool (e.g., Wonderware's WindowMaker visualization application development tool).

In an embodiment of the invention, the top level of a template container/directory is divided according to the type of references that are present within the templates. In the example set forth in FIG. 6, two top-level folders are presented. An Archestra Templates folder 602 is a root for a folder hierarchy that stores graphical symbol templates that reference Archestra application object-templates (corresponding to a state-of-the-art supervisory process control architecture). An INTOUCH Symbols folder 604 is a root for a folder hierarchy that stores graphical symbol templates that are intended to reference only INTOUCH Remote or Local Tags (corresponding to a legacy process control architecture), and do not contain any ArchestrA object template references.

Two types of folders are presented in an exemplary template container hierarchy—ordinary folders and template folders. Ordinary folders, identified in the exemplary user interface within FIG. 6 by folder icons, can contain other ordinary folders, template folders, or symbol templates. Template folders, identified in the exemplary user interface within FIG. 6 by ball icons, contain symbol templates (i.e., no other folders) that include animation expressions containing references to an application component type. In the illustrative example, template folder names correspond to application object templates referenced by the symbol templates contained in the particular template folder. In the illustrative example set forth in FIG. 6, each symbol template contained in the $FixedSpeedMotor symbol template folder includes one or more animation expressions referencing a $FixedSpeedMotor. In this illustrative embodiment, each symbol template can contain references to only the $FixedSpeedMotor application object template. However, this restriction can be relaxed, or other naming protocols applied (e.g., compound/juxtaposed template names within the directory structure) to support grouping, under an appropriately named symbol template folder, symbol templates that include references to a same set of multiple object templates.

Ordinary file system folders, such as a motors folder 606, a transmitters folder 608, a valves folder 610, a clarifiers folder 612 and a conveyors folder 614 can be placed at any level within the container structure's hierarchy. On the other hand, template folders cannot contain other template folders since a template folder specifying a particular application object template is intended to denote a single source type (e.g., application object template) for all graphical symbol templates contained therein.

The directory depicted in FIG. 6 supports specifying any number of intermediate levels of ordinary folders below either of the two top-level folders 602 and 604. In the illustrative example, the motors folder 606, the transmitters folder 608, and the valves folder 610 are contained within the Archestra Templates folder 602. The clarifiers folder 612 and the conveyors folder 614 are contained within the INTOUCH Templates folder 604.

In the illustrative embodiment, the motors folder 606 is expanded to reveal, at the lowest level of the hierarchical tree, a set of template folders ($FixedSpeedMotor 620, $FixedSpeedBidirectionalMotor 622, $TwoSpeedMotor 624, and $VariableSpeedMotor 626). Each of the template folders, in turn contain a set of stored graphical symbol templates. The symbol templates stored within the (selected) $FixedSpeedMotor folder 620 are depicted within a symbol templates pane 616 to the right of the template directory pane 600.

All Unassigned Folders Initially Go Into The Top-Level Archestra Folder.

In the illustrative example, Archestra graphical symbol templates (stored within the Archestra Templates folder 602), if possible, are stored according to an application component type (e.g., an application object template) identified in a reference associated with the graphical symbol template. More specifically, if references within a graphical symbol template (from which graphical symbol instances are created) all correspond to a single application object template (from which application object/data sources for the symbol instances are created), then the graphical symbol template is stored within a graphical symbol template folder identifying the referenced application object template. Thus, referring again to the illustrative example set forth in FIG. 6, all graphical symbol templates stored within a $FixedSpeedMotor template folder 620 only contain references specifying a $FixedSpeedMotor application Archestra object template.

Placing symbol templates under folders bearing object template names of a data source for symbol instances enables a visualization application designer to easily locate an appropriate set of candidate symbol templates based upon the designer's knowledge of a contemplated data source type for an instance created from a selected symbol template. On the other hand, symbol templates with references to multiple different object template types are placed within a top-level symbol template folder. Alternatively, as mentioned above, appropriate compound names can be assigned to a template folder containing a set of symbol templates based upon the multiple reference types contained within each one of the folder's symbol templates. Alternatively an ordinary folder is created (as opposed to a symbol template folder) and thereafter the ordinary folder is assigned a name based upon its contents.

Furthermore, the above-described embodiment does not allow a directory structure to have multiple, nested, levels of graphical symbol template folders (due to the requirement that symbol templates referring to a single application object template/tag be placed within a folder naming that template). However, in alternative embodiments that restriction is relaxed. In those alternative embodiments, the library directory tree structures support multiple, nested, levels of template folders.

Returning to FIG. 3, the symbol library 306 is maintained via the symbol library manager 312. The symbol library manager 312 carries out a variety of container/directory management operations including: creating folders, renaming folders and symbol templates, moving folders and templates, deleting folders and symbol templates, and importing/exporting graphical symbol templates into/from/between the individual application-specific symbol template libraries supported by the symbol library 306.

The symbol library manager 312 supports creating additional structures within application-specific symbol template containers for the purpose of organizing symbol templates contained therein. The symbol library manager 312 supports creating template folders by browsing a repository of application object template names and thereafter creating a symbol template folder having a selected application object template name. Alternatively, a new template folder is generated by the symbol template creation tool 302 when a new symbol template is created/stored containing references a single application object template, and the application object template name does not exist on a template folder positioned directly under the top-level Archestra Templates folder 602. In the case where the template name exists on a lower-level template folder, a user can move the new symbol template to the lower-level template folder and delete the automatically created template folder bearing the same template name.

The symbol library manager 312 supports renaming folders or symbol templates in the library. However, since template folders are named according to the application object templates identified in their constituent symbol templates, re-naming template folders identifying application object templates is not ordinarily performed.

The symbol library manager 312 supports moving ordinary and template folders or symbol templates within an application-specific library container's hierarchy. However, the symbol library manager 312 blocks moving template folders under other template folders. Furthermore, the symbol library manager 312 prevents placing symbol templates within the wrong high-level folders. For example, referring to FIG. 6, ArchestrA symbol templates cannot be placed under/within the INTOUCH folder 604, and visa versa.

The symbol manager 312 also supports deleting both folders and symbol templates from the library 306. Finally, as mentioned previously above, the symbol library manager 312 maintains, for each visualization application, a list of each view/window having an instance of each graphical symbol template within the particular visualization application. Potential alternatives/variations of this function include: identifying each symbol instance (as opposed to identifying a view/window), and maintaining a global list including, for each symbol instance, at least the application (and potentially the view/window/display) within which the graphical symbol resides. This part of the symbol library manager 312 facilitates propagating any subsequent changes to a graphical symbol template, to the template's child instances.

A symbol template recovery utility 314 is also provided, in an exemplary embodiment, that facilitates recovering a previously deleted graphical symbol template (in the symbol library 306) from a remaining symbol instance. The smart symbol instances, with the exception of a name of their parent symbol template, contain all the information needed to re-create a previously lost parent template. The symbol template recovery utility 314 re-creates the graphical symbol template based upon information (e.g., a unique symbol template identification, bitmaps, scripts, etc.) maintained within each graphical symbol instance. The unique symbol template identification ties a particular symbol template to all instances created from the template. All the information supporting a particular symbol is included in each instance—so that it is not necessary at runtime to reference a symbol library to draw a symbol and connect a data source to the symbol instance. Such symbol instance information includes data source references, supporting graphics drawing instructions, supporting bitmaps, and any scripts that facilitate animating the graphical symbol. Thus, in an exemplary embodiment, the only information lost when a graphical symbol template is lost is the text name of the template (which is used to identify the template to a developer when viewing a set of templates within a particular template folder). When a template is re-created from an instance, a text name is reassigned to the template.

The symbol manager 312 supports importing and exporting symbol templates to other applications. Any selected symbol templates, or the entire set of symbol templates within a selected application container can be exported, by the symbol manager 312, to a disk file, as a symbol template package file. Similarly, the symbol manager 312 possesses the capability to import any symbol template package file into a designated application (on the same or a different machine). The import/export utilities enable users to copy symbol templates from one visualization application to another, thereby enabling designers of visualization applications to extend graphical symbol template definitions beyond the above-described application boundaries. The import/export utilities facilitate copying previously defined symbol templates/libraries into other applications (or other logical groupings)—even applications residing at remote locations within a networked system. In this way, symbol graphics, if desired, are standardized across entire plants and organizations by copying a standard set of symbol templates to a designated set of applications within a plant, an organization, etc. Furthermore, it is noted that such transportability of graphical symbols is achieved without copying visualization application windows comprising graphical symbol instances. Instead, only the symbol templates are copied to a recipient application. However, embodiments of the present invention support copying entire applications as well.

With continued reference to FIG. 3, a symbol instance creator 316 is invoked within a visualization application development environment (e.g., Wonderware's INTOUCH WindowMaker), to create graphical symbol instances from graphical symbol templates 304 previously stored in the symbol library 306. From a user's perspective, invoking the symbol instance creator can occur in any of a variety of ways. For example in one visualization application design environment a developer selects/drags a graphical representation of a symbol from a palette/menu and drops the symbol at a desired location within an open visualization application edit window. Alternatively, while in an application window edit mode, an area is selected on a visualization application design window pane.

Figure 6:
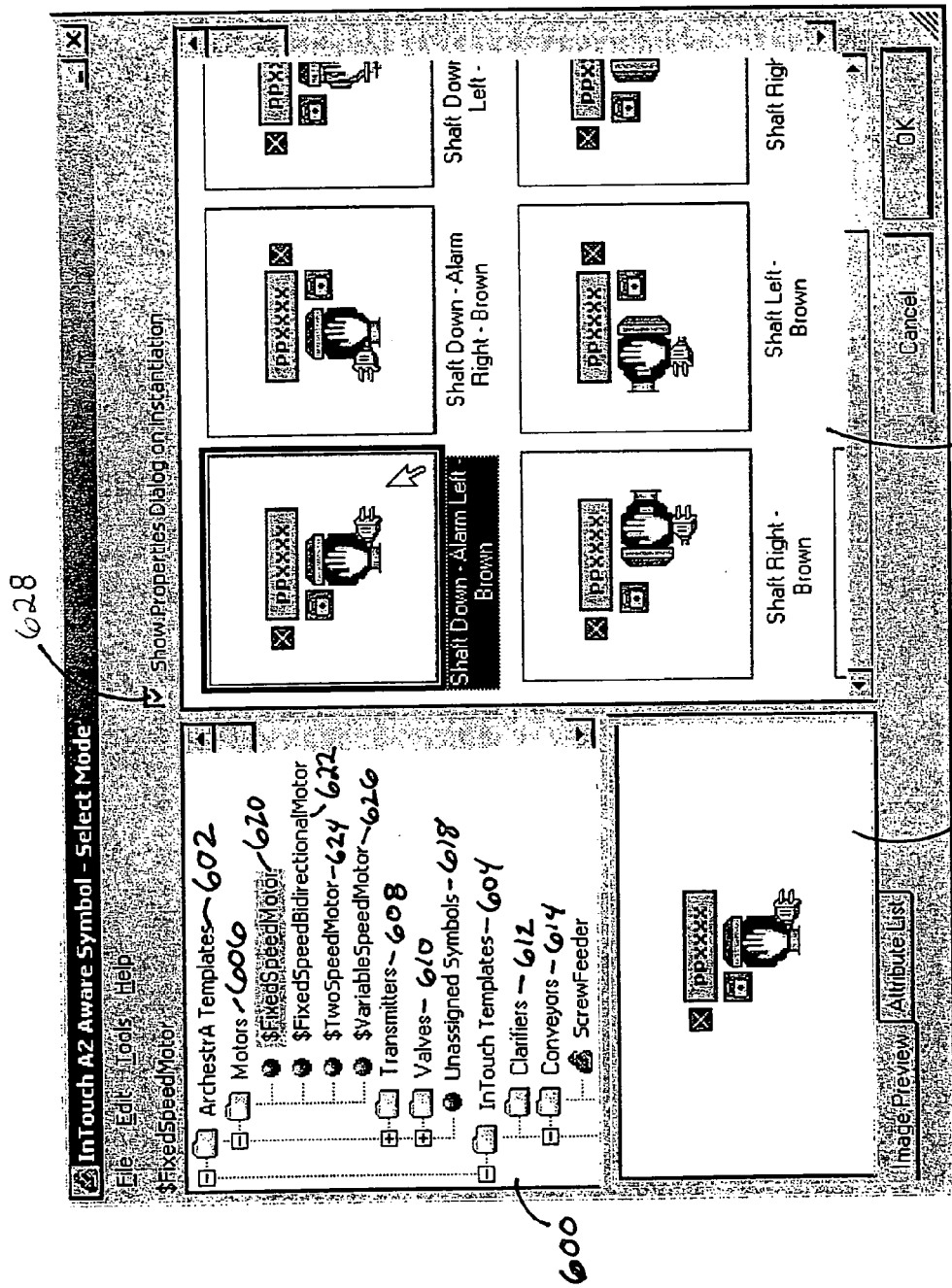
FIG. 6 is an exemplary symbol template browser interface for selecting a symbol template.

Upon being invoked, the symbol instance creator 316 launches, by way of example, the graphical symbol selection dialog depicted in FIG. 6 that enables a user to choose a specific graphical symbol template from which an instance is created. A user selects a particular symbol template folder based upon the particular data source that the developer seeks to add to a currently open visualization window. Upon selection, a set of available symbol templates are displayed within the symbol templates pane 616.

After a user selects one of the symbol templates within the symbol templates pane 616, the instance creator 316 launches a symbol instance editor 318 including a properties dialog interface illustratively depicted, by way of example, in FIG. 7 (described further herein below). Through the properties dialog of the instance editor 318, a user completes specifying a symbol instance by designating particular data sources for placeholders contained within the selected graphical symbol template in a task referred to herein as "resolving" references. Such data sources include process control system application objects and tagged data sources. It is noted that, in an embodiment of the invention, a data source for a symbol instance may be an existing one, or alternatively, one created from an object template located via a browser launched by the instance editor 318 via the properties dialog. After a graphical symbol instance has been created in a visualization application window, the symbol instance editor 318 can be recalled to edit the previously designated data source links when the symbol instance was first created. As previously mentioned, a permanent association is maintained between a symbol template and all symbol instances created from the symbol template such that changes to the symbol template are propagated to the associated symbol instances.

Graphical Symbol Template Structure

Figure 4:
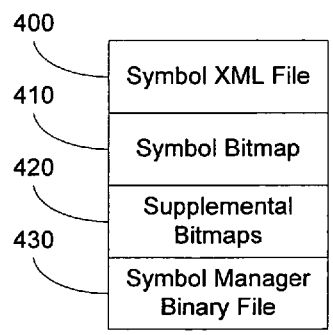
FIG. 4 is an exemplary symbol template structure from which symbol instances are created and references resolved, and for which an association is maintained.

Having described an exemplary visualization application design/development environment, attention is directed to an exemplary set of fields within a graphical symbol template structure suitable for use in the above-described design environment for creating data-driven/animated graphical views of industrial processes comprising a set of graphical symbols (cells). Turning to FIG. 4, an exemplary graphical symbol template structure includes a symbol XML file 400. The symbol XML file 400 contains data and structure describing how to build and animate an associated graphical symbol instance in a visualization application. The contents of the XML file 400, in combination with specified bitmaps, define how a graphical symbol is rendered—including scripts/expressions defining animation behavior of a symbol instance in response to changing input data values from a specified source. For example, the XML file 400 can define a rectangle by size, color, position, associated bitmaps, as well as define an animation behavior wherein the portion of the rectangle filled by a particular color corresponds to a present value of a process variable provided by an application object corresponding to a process data source.

The animation expressions within the XML file 400 for a graphical symbol template include references to particular types of data sources. The data source references specify application component types (e.g., application object templates) that provide data for driving animation behavior of a symbol instance created from the graphical symbol template. In an exemplary embodiment, a data source reference facilitates associating the graphical symbol template with a particular type of application component (e.g., a tank level application object template) data source.

Furthermore, the references facilitate arranging graphical symbol templates within a library of templates. By way of example, when a symbol template is saved to the library, the symbol template is placed in a particular symbol template library folder (described further herein below) corresponding to the application component data source type specified in an animation expression contained in the XML file 400. For example, a symbol template, used to create animated symbol instances that change appearance according to input data from a "fixed speed motor", is placed within a template library folder holding templates that include one or more data source references that specify a fixed speed motor data source type. Such references contained in the XML file 400 thus specify a general type of application component (e.g., application object template) for which the graphical symbol template is suitable for providing an animated graphical display. This facilitates associating graphical symbols, generated from the symbol templates, with process control automation/application objects that drive the visual appearance (e.g., animation state) of the graphical symbols.

A symbol bitmap 410 represents/defines a thumbnail size bitmap for the smart symbol (i.e., one used for a symbol library interface view of the smart symbol template).

Supplemental bitmaps 420 specify bitmaps utilized to render an image of a graphical symbol instance in a view. By way of example, a tank symbol can be rendered by means of drawing primitives (e.g., rectangles, lines, curves, etc.); however, the background of the tank is a bitmap image. Another example is an artist's rendering of a valve handle (as opposed to a schematic/block view) that augments a valve defined by a set of primitive graphic shapes.

Symbol manager data 430 comprises, by way of example, a binary file containing a unique ID assigned to the particular symbol template. The unique ID facilitates creating an association between the symbol template and symbol instances created from the symbol template. The symbol manager data 430 also contains a directory structure and template names of all the symbols associated with the graphical symbol template.

Figure 5:
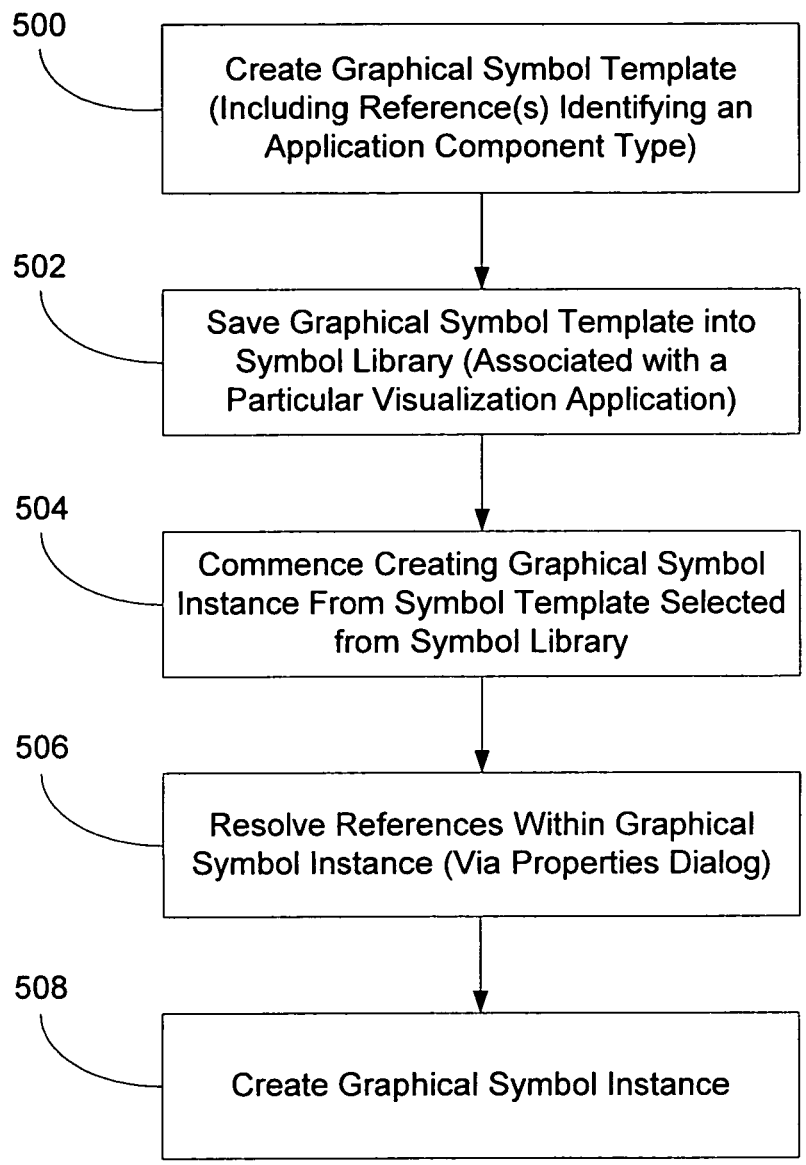

Turning to FIG. 5, a set of steps summarize a method for initially creating an animated graphical symbol template including a reference to a process control application component type, and thereafter creating a graphical symbol instance from (and resolving any references to process control application component types contained within) the graphical symbol template for use within a visualization application in accordance with an embodiment of the present invention. By way of example, the graphical symbol template includes an animation expression that defines an animation behavior of graphical symbol instances created from the symbol template. The animation expression includes the aforementioned reference to a process control application component type.

During step 500, a user, through the symbol template creation tool 302, defines a graphical symbol template, of the type described herein above with reference to FIG. 4, including one or more animation expressions including one or more references identifying a process control application component type. In an embodiment of the invention, the references identify either a process control application object template or a remote tag. The identified application component type corresponds to a suitable type of application entity that will provide data to (drive) an input associated with a graphical symbol instance created from the symbol template.

By way of example, and not limitation, the graphical symbol templates are initially generated from graphical symbol cells created on a Wonderware WindowMaker process visualization window design/development utility interface. The graphical symbol cells include user-configurable graphics and animation script/expression sections including one or more placeholders facilitating designating the aforementioned references. In a particular embodiment, the references are established by selecting an "animation links" option on a symbol template editor interface, selecting a particular type of animation link (e.g., an application object, a tag, etc.), and thereafter selecting from a set of candidates for the selected type (e.g., application object templates) to define a type of animation data source for the symbol template. In a particular example, based upon Wonderware's ArchestrA architecture, a user specifies: (1) a particular application object template, and (2) a specific attribute associated with the selected application object template. The reference is specified in the form of "Galaxy:$<TemplateName>.<AttributeName>"—where the <TemplateName> can be followed by more contained object names and the <AttributeName> can be a hierarchical set of attribute names. An example of a specified reference is "galaxy:$valve.pv". When a symbol instance is created based upon a selected data source (e.g., an application object), the general references to the TemplateName (e.g., $valve) are replaced by an appropriate name based upon the selected data source. As mentioned above, animation is defined in a symbol template in the form of an expression. The expression specifies a relationship between an input value provided by the reference and an output visual state of the animated graphical symbol. Upon filling in the reference placeholders and specifying any user-selectable parameter values for the animation behavior of the graphical symbol template, the user invokes a "generate symbol template" command causing the symbol template creation tool 302 to create a new graphical symbol template containing the code and data described hereinabove with reference to FIG. 4. The user is prompted to provide a name for the new graphical symbol template.

In the exemplary embodiment, during step 502 a user invokes a save operation within a template editor interface by invoking an operation for generating a graphical symbol template. In response a graphical symbol template defined during step 500 is saved within one of the application-specific symbol template containers of the symbol library 306. The application-specific containers, described above, each comprise a directory tree structure within which the graphical symbol templates for the particular applications are stored. Furthermore, to the extent the graphical symbol template includes references to only a single application component type (e.g., application object template), the graphical symbol template is automatically stored within a folder in the application-specific container of the symbol library 306 corresponding to the application component type (e.g., $tank folder). A user is provided the opportunity to provide a customized name (e.g., SteelTank1) in place of an initially assigned default name (e.g., NewSymbol) for the symbol template.

The location of the saved graphical symbol template within the directory tree structure depends upon the type of application object template specified by one or more references within the saved graphical symbol template. By way of example, if a symbol template has references associated with a single application object template (e.g., $FixedSpeedMotor), then the symbol template is placed within a symbol template folder identifying the application object template (e.g., $FixedSpeedMotor 620). If an appropriate template folder has not previously been established (see, FIG. 6), then one is created. On the other hand, if multiple application object templates or only generic data sources are specified in the references, then the object template is placed, for example, in the Unassigned Symbols folder 618. If only INTOUCH tags are specified, then the symbol template is stored within a top-level folder within the INTOUCH templates folder 604.

With continued reference to FIG. 5, after creating and storing a graphical symbol template within an application-specific container of the symbol library 306, during step 504 a developer of a visualization application window/view invokes the symbol instance creator 316 to initiate creating a graphical symbol instance from the graphical symbol template. By way of example, step 504 is carried out through a wizard/tool incorporated into a visualization application view editor (e.g., WONDERWARE's INTOUCH visualization interface development/presentation software). After a user selects the wizard/tool for creating a symbol instance from a symbol template, a cursor is generated that prompts a user to select a location within a view for placement of a graphical symbol instance. Upon selecting a location the wizard/tool enters a template "select" mode wherein a dialog box (see, e.g., FIG. 6) is generated through which the developer selects the previously stored graphical symbol template from a set of available symbol templates under a selected template folder.

Referring again to FIG. 6, in the illustrative example, the developer has selected the $FixedSpeedMotor application object template folder 620 (highlighted) under the standard Motors folder 606 created under the ArchestrA Templates folder 602 (the general container for all symbol templates). Selecting the $FixedSpeedMotor symbol template folder 620 causes all the symbol templates contained within the $FixedSpeedMotor folder 620 to be rendered in the symbol templates pane 616. The user selects one of the symbol templates in the pane 616 for which a graphical symbol instance is to be created (e.g., "Shaft Down—Alarm Left—Brown" in the previously selected $FixedSpeedMotor template folder). An image preview/attribute list pane 630 displays information related to a currently selected, but not yet instantiated, graphical symbol. When a user selects a particular symbol template for purposes of creating an instance, the symbol instance creator 316 commences a set of steps (e.g., launches a symbol properties dialog) for configuring attributes, including resolving application object template names to application object instances, for a graphical symbol instance corresponding to the selected graphical symbol template.

It is noted that graphical symbol templates can be selected via any one of a variety of interfaces. In the above example, a user selects a graphical symbol template by viewing a directory containing a set of available graphical symbol templates—and thereafter associates an application object with a graphical symbol instance corresponding to the selected graphical symbol template by resolving the references contained within the graphical symbol instance to the application object. Alternatively, graphical symbol templates are presented in the form of a pallet, and a user invokes the symbol instance creator 316 by dragging and dropping an icon/graphical image, corresponding to the graphical symbol template, from the pallet to a visualization application view. Other user interface mechanisms for invoking a tool for creating a graphical symbol instance will be known to those skilled in the art.

Furthermore, in an alternative embodiment that reverses the selection process, a visualization application development interface/dialog box presents a set of application object templates—the prospective data source types driving the animation characteristics of a graphical symbol. Upon selecting a particular one of the application object templates, a set of graphical symbol templates corresponding to the selected application object template are presented to the user. After selecting one of the graphical symbol templates, the symbol instance creator 316 creates a graphical symbol object corresponding to the selected graphical symbol template.

Actual creation of a graphical symbol instance can occur at any of a variety of stages of the visualization application view development process. In an embodiment of invention, after the user drops the selected graphical symbol image within the application view, the symbol instantiation tool 307 creates a graphical symbol object, corresponding to the selected graphical symbol template. Alternatively, creating a graphical symbol instance is delayed at least until a user specifies actual data source (object) links for references contained within the scripts associated with the selected graphical symbol templates. References within partially specified graphical symbol instances are resolved during step 506.

In an embodiment of the present invention, during step 506 a user specifies links to application objects/data sources for each of the unresolved references originally specified within the selected application object template. The linked data sources drive/animate display characteristics associated with a graphical symbol instance created from the previously selected graphical symbol template. A graphical symbol properties dialog, depicted by way of example in FIG. 7 is launched during step 506 after a user selects a graphical symbol template. In the illustrative embodiment, a show properties dialog upon instantiation option 628 enables a user to configure automatic launching of the properties dialog in response to a user designating a particular graphical symbol template from the set of templates represented in the symbol templates pane 616.

The graphical symbol properties dialog enables the user to resolve previously unresolved references (presented in the form of placeholders by the graphical symbol template). Unresolved references/placeholders are provided in the form of generic names (e.g., "Galaxy:me.pv"), reference strings including application object templates (e.g., "Galaxy.$pump.pv"), etc. As will be explained further herein below, the unresolved references are resolved by, for example, browsing a collection of application object instances that currently exist in a designated logical grouping of application objects (referred to herein as a "Galaxy") and selecting one of the application objects, or by simply typing in an application object instance name (that may not yet exist). For all unresolved references of the same syntax within the selected graphical symbol, designating a particular application object instance enables automated graphical symbol configuration functionality to replace previously unresolved references by application object-specific references.

In the illustrative embodiment, a graphical symbol properties dialog interface 700 includes a set of fields summarizing various properties associated with a graphical symbol instance. A first group of fields specifies physical and logical attributes of an application containing the specified graphical symbol instance. A GR Node Name field 702 (e.g., markb05) identifies a server of a database containing a master copy of an application associated with the graphical symbol instance. A galaxy name field 704 (e.g., ReactorDemoGal) specifies a namespace (e.g., Galaxy, or any other suitable logical grouping of entities such as an enterprise) that is presently being used by a visualization application containing the graphical symbol instance. The GR Node Name field 702 and galaxy name field 704, in combination, facilitate specifying a namespace in a database that is being used by the visualization application.

A second group of fields define graphical symbol instance attributes. A graphical image associated with a currently selected graphical symbol template is displayed in a preview pane 705. A symbol template field 706 identifies, by name, the currently selected graphical symbol template. The identified graphical symbol template is the source for the graphical symbol structure (specified during step 504) that will be completed/instantiated after resolving references during step 506. This association between a graphical symbol template and the graphical symbol instances created from the template is maintained within at least the visualization application design environment such that any changes to data within the graphical symbol template after instantiating graphical symbol instances from the template are merged via refresh mechanisms into the data within each graphical symbol instance of the symbol template. Furthermore, a propagation mechanism exists during runtime such that changes (e.g., changing the size, color, text, animation behavior (add/remove/modify animation expressions), etc.) to a symbol template are passed to any open and active windows/views that contain a symbol instance created from a changed symbol template regardless of whether an affected visualization application is running on the same node or a different node upon which the change to the symbol template takes place. In the case of a running application window/view, the changes are not implemented until after the particular window/view has been closed/minimized and then reopened/restored (or otherwise expressly refreshed by action of a user).

The following describes, by way of example, propagating a change to a symbol template to symbol instances created from the template. The symbol template is opened and modified via a symbol template editor. The user thereafter invokes an operation for storing the changed symbol template. In response, a confirmation dialog displays/lists all currently open windows/views that contain symbol instances created from the changed symbol template. Data source references, potentially affected by the changes, are displayed in "before" and "after" states. After a user confirms the changes, the revised symbol template is stored in the appropriate symbol template library. Thereafter, each view/window in a corresponding visualization application is opened to determine the existence of symbol instances corresponding to the changed symbol template (by observing the symbol template IDs of the symbol instances in the application views). If an affected symbol instance is found, then it is updated based upon the new version of the symbol template. Furthermore, all open windows/views are refreshed to reflect the updated underlying symbol instances. Such updates extend to remotely operating views on non-local nodes.

Figure 8:
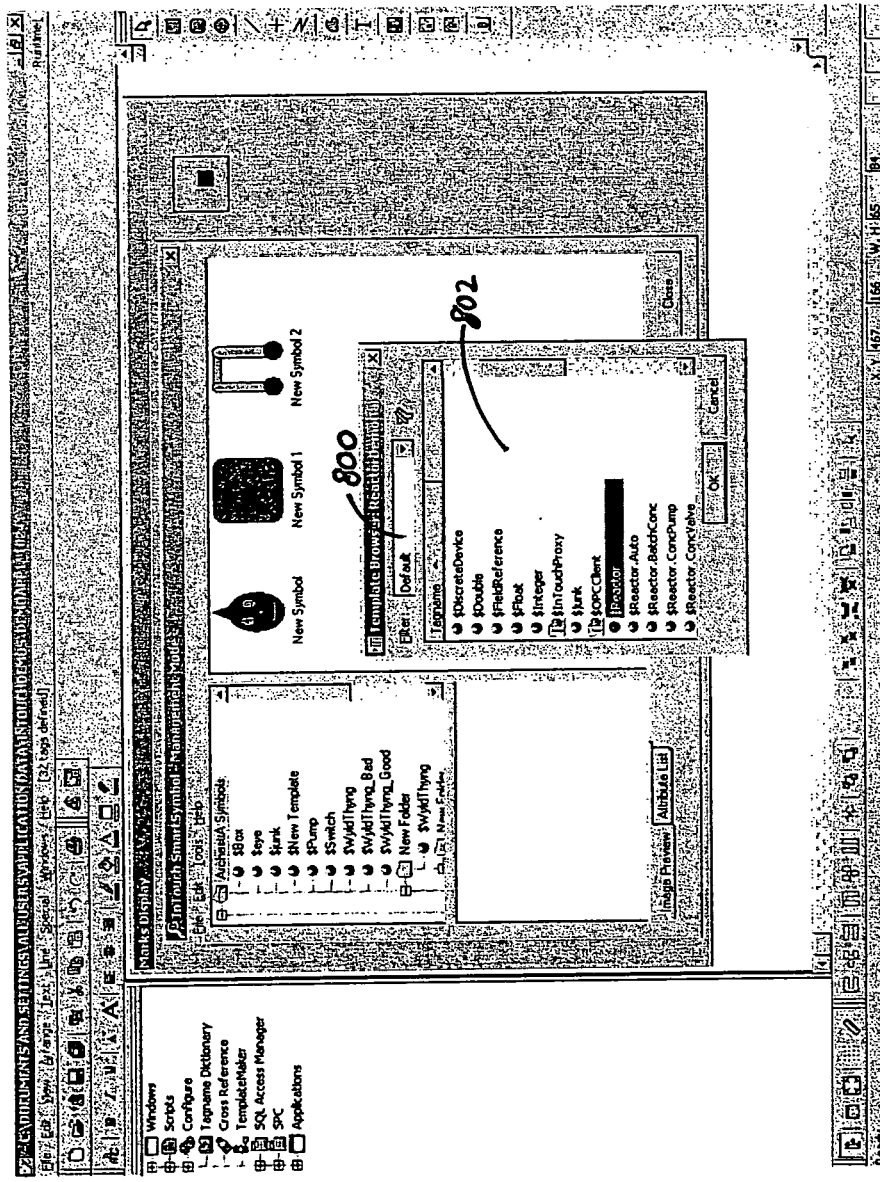
FIG. 8 is an exemplary user interface including a template browser window for selecting a symbol template.

A graphical symbol template browse interface button 707 enables a user to browse a set of graphical symbol templates via a browse dialog box. An example of a symbol template browse dialog box is depicted, by way of example, in FIG. 8. A filter field 800 enables a user to limit retrieved symbol templates, displayed in results field 802 to ones meeting a specified filter criterion (e.g., graphical symbol templates specifying $Box application object template references). In the illustrative example, the "Default" filter corresponds to no filter, and all templates in the application-specific container of symbol templates for a current application are retrieved and displayed within results field 802. Using the browse dialog box, a user is able to retrieve a list of candidate graphical symbol templates to replace the currently selected graphical symbol template for creating a graphical symbol instance. Upon selection, the template data is merged into the instance data (to the extent that an application object was previously selected) and the instance references are refreshed.

An ArchestrA Template field 708 identifies an application object template for a suitable source application object instance when specifying instance references for the graphical symbol instance. The instance references, when resolved, specify links to data sources that drive/animate the display characteristics of the new graphical symbol instance. An Archestra Instance field 710 specifies a currently selected application object supplying the data link references for resolving template references enumerated within a Template References column 712. A data type column 714 specifies the form of data supplied by a data source identified within an Instance Reference column 716.

In the illustrative example, the symbol template specified in the symbol template field 706 is LightBlueBox1, and a single template reference, Galaxy:$Box.pv, is specified in the Template References column 712. The Archestra Template field 708, indicating the application component type that will drive references within the graphical symbol instance, specifies an application object template identified as $Box. The currently selected application object instance, designated in the Archestra Instance field 710, is an instance created from the $Box application object template and is named SmallBlueBox. The text string "Galaxy:SmallBlueBox.pv" represents a resolved template reference "Galaxy:$Box.pv". The resolved reference was provided automatically upon designating the application object "SmallBlueBox". The SmallBlueBox application object thus supplies a discrete data value for driving an animation behavior associated with the graphical symbol instance (created from the LightBlueBox1 symbol template) via a Galaxy: SmallBlueBox.pv attribute.

Figure 7:
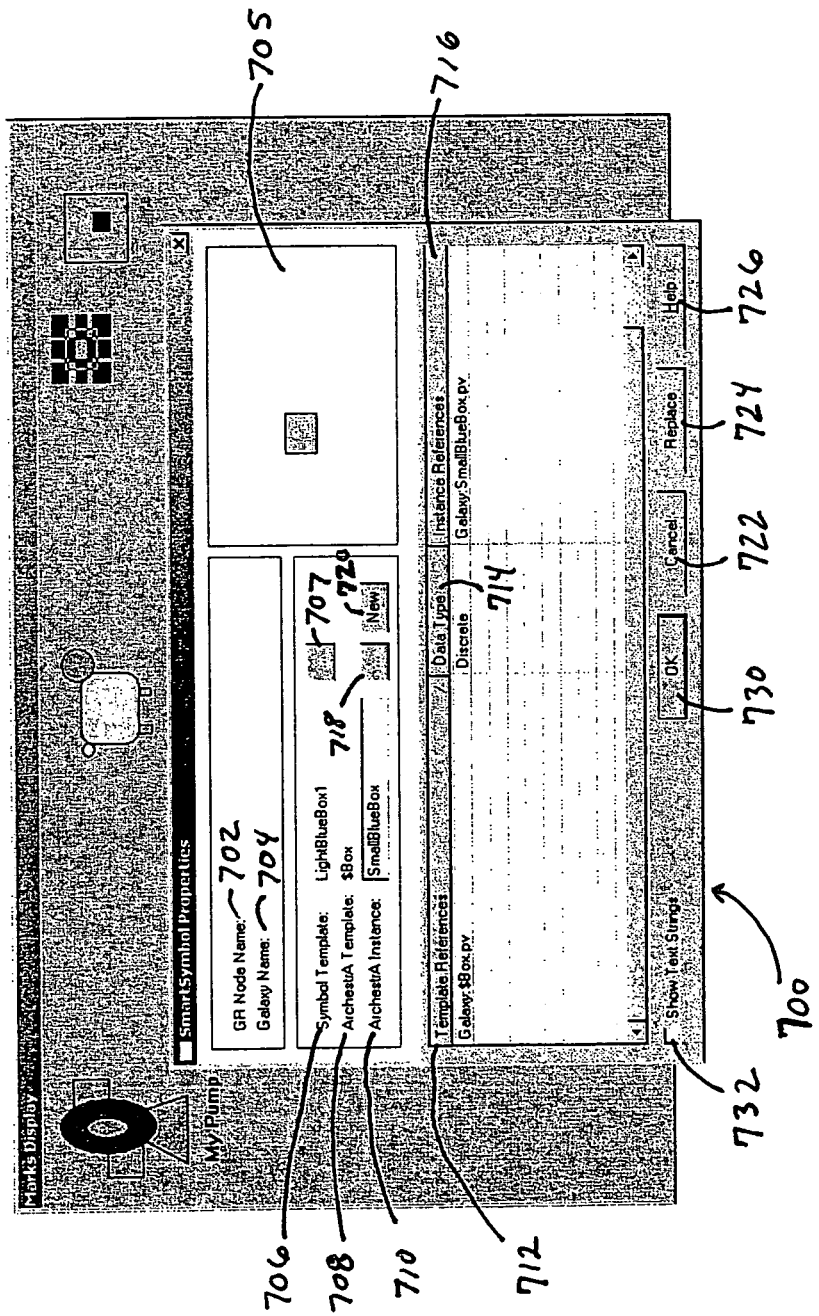
FIG. 7 is an exemplary symbol properties dialog facilitating resolving a set of references for a symbol instance.
Figure 9:
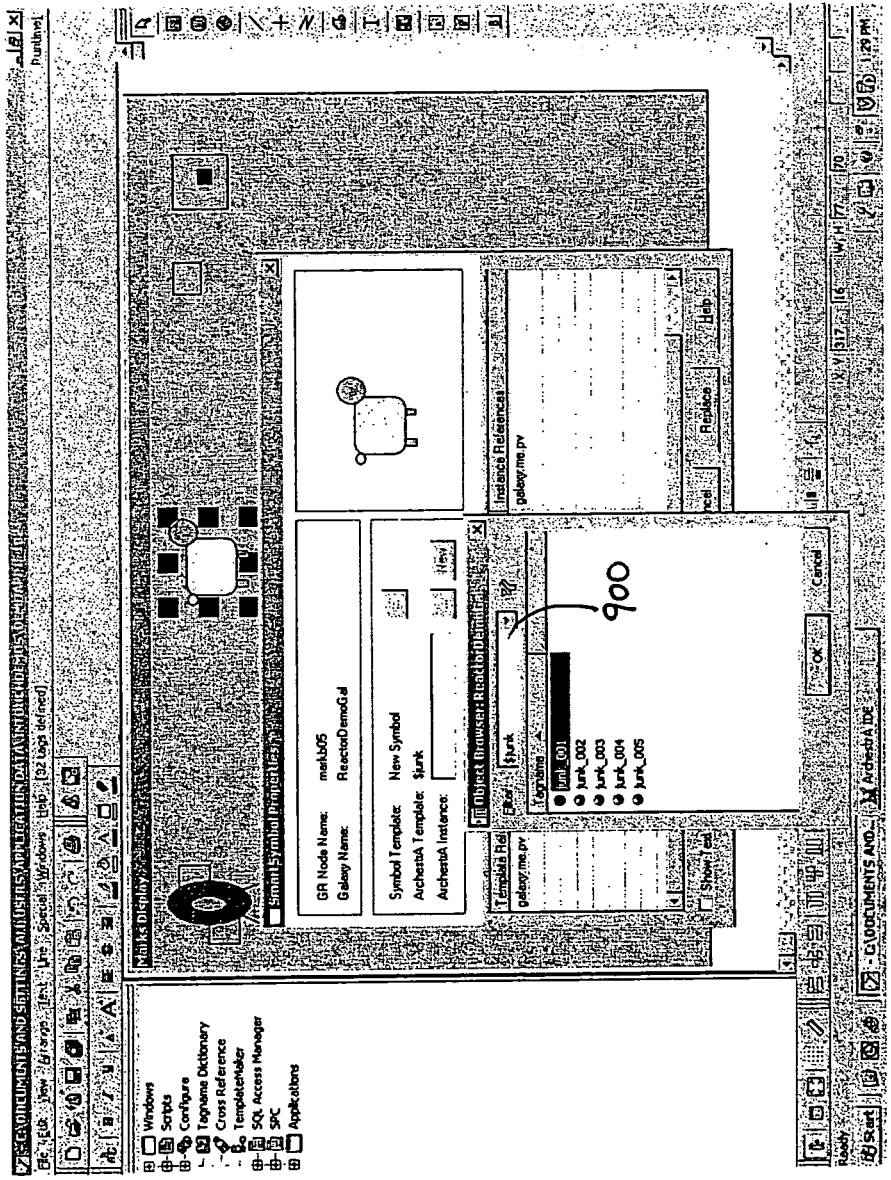
FIG. 9 is an exemplary user interface including an application object browser window for selecting a particular application object for purposes of resolving references for a symbol instance.

The properties dialog interface depicted in FIG. 7 shows the dialog interface after an application object instance has been selected. In an exemplary embodiment, the application object instance is specified via an application object browse button 718 that enables a user to browse a set of application objects via a browse dialog box. An example of the application object browse dialog box is depicted, by way of example, in FIG. 9. A filter field 900 enables a user to limit retrieved application objects to ones meeting a specified filter criterion (e.g., application objects created from the $junk application object template). In the illustrative example, the $junk filter results in retrieval of a set of five application object instances created from the $junk application object template. Using the application object browse dialog box, a user is able to retrieve and list a set of candidate application objects for resolving references specified within the template references column 712.

As an alternative to selecting an existing application object for resolving symbol template references, a new button 720 invokes a dialog for creating a new instance from an application object template specified in the Archestra Template field 708. The new object instance becomes the data source for the references specified in the graphical symbol object instance. In an exemplary embodiment, when a user selects one of the listed application object instances, the output variables of the selected application object instance are applied to the set of symbol template references listed in column 712 and the corresponding instance references are filled in column 716. The system replaces all generic references specified in the template references listed in column 712 as well as all references specifying template names that match the template of the selected application object instance. In the illustrative example, the $Box string in the reference listed in column 712 is replaced by an instance named "SmallBlueBox" (created from a $Box application object) in the resolved reference listed in column 716. At this point, referring again to FIG. 5, a fully specified graphical symbol instance is ready to be created during step 508.

The symbol instance properties dialog interface 700 includes a set of function buttons. A cancel button 722 exits the property dialog without making any changes affecting graphical symbol instances. A replace button 724 launches a dialog box for specifying a search string and replace string to be carried out on the items listed within the Instance References column 716. A help button 726 launches a help dialog specifying a listing of user-selectable help topics. An OK button 730 implements the current selections specified in the properties dialog box. In an embodiment of the invention, selection of the OK button 730 invokes creation, at step 508 set forth in FIG. 5, of structures for a graphical symbol instance based upon the values set forth in the fields of the properties dialog. While a number of symbol instance creation schemes are contemplated, in an exemplary embodiment structures corresponding to the symbol instances are created and placed within a view/window structure at a development stage of a visualization application. The symbol instance structures define graphics and animation behaviors (including application object sources that drive the animation). Later, the view/window containing the symbol instance structures is opened and the symbol instances are executed in a runtime environment.

A Show Text Strings option 732 allows for the display and editing of static text strings associated with the displayed symbol template (a label, a set of values). For example, the text string can be a label such as "Reactor #1" that is placed in a text box positioned on the top of a symbol. Another example is a set of static tick levels on a symbol. The text strings, to the extent present, are shown in a list view which is a pop-up dialog containing a list of default text strings associated with symbol as well as any substitute/supplementary text strings. The text strings option 732 thus allows the user to edit the string manually or via a search and replace function associated with the replace button 724.

After defining a symbol instance via a properties dialog depicted by way of example in FIG. 7, a developer can recall the properties dialog for the previously created graphical symbol instance and edit any of the references to specify a different data source and then re-save the symbol instance.

Thus, it can be seen by the above-described method and user interfaces, that the system embodying the present invention facilitates streamlined design of user interfaces including animated graphical symbols driven by referenced data sources associated with process control application objects. The combination of template development, object association, instance structure creation interfaces enables a developer to easily create, instantiate, modify, and manage supervisory-level graphical views, of process control system components, comprising animated graphical symbol instances. Such relatively easy creation of associations between the smart symbols and automation (application) objects facilitates creating, in a relatively straight-forward manner, animated views for monitoring the status/operation of process control and manufacturing systems.

In an exemplary embodiment references within the symbol template identify any of a variety of data sources including: a process control application object template, a generic process control application object, and remote tags (representing a data source). The properties dialog set forth in FIG. 7 corresponds to a symbol template/instance specifying an application object template as a data source type. However, the present invention supports a variety of data sources types including, by way of example, templates including generic references (i.e., do not specify an application object template) and tags (specifying a data source by a memory location rather than an application object). In such cases appropriate dialog boxes are presented that enable a developer to specify specific application objects and memory locations for the reference placeholders provided by the symbol template. Appropriate browse utilities are supported for retrieving applicable potential sources driving the specified symbol data inputs.

IOSetRemoteReferences function

In an exemplary embodiment of a design environment embodying the present invention, visualization applications are executed, at least in part, based upon associated scripts. When executed within the context of visualization applications at runtime, the scripts implement programmed animation behavior (including presenting/displaying a current parameter value such as temperature, pressure, flow, etc.) for the graphical symbols in accordance with changes to input data values (driven by data sources identified by references within the graphical symbol scripts). By way of example, at runtime, scripts associated with active windows are executed to update values supplied by data sources in a process control system identified by references embedded within graphical symbols. The appearances of the graphical symbols are updated to reflect changes in the data values provided by the referenced data sources.

In an exemplary runtime environment including graphical symbol instances including references to application object sources/attributes that drive animation behavior associated with the instances, an IOSetRemoteReferences function enables visualization application developers to redirect/rename data source references within the graphical symbol instances at runtime. More particularly, the IOSetRemoteReferences function call replaces a specified generic/placeholder reference text string (e.g., motor_x), or portion thereof, by a specific reference text string (e.g., motor_2) within expressions contained in scripts anywhere in a visualization application. Such capability enables dynamic/conditional/late binding of data sources (specified initially by generically-named references) to smart symbol instances in a visualization application.

By way of example, application developers write visualization application scripts including the IOSetRemoteReferences function to specify redirecting/renaming references at runtime. Furthermore, by placing conditional branch instructions ahead of script lines specifying the IOSetRemoteReferences function call, designers can specify conditions under which the IOSetRemoteReferences function call is carried out (e.g., the IOSetRemoteReferences function is skipped until a particular condition is met). For example, a particular source object instance providing data values driving a particular appearance characteristic of a graphical symbol instance is switched upon meeting a particular condition. Alternatively, a source object is switched in response to a user clicking a particular interface button (possibly representing that data source).

By way of example, the IOSetRemoteReferences function includes a set of fields describing a substitution to be performed to particular reference text strings within a graphical symbol script. In an exemplary embodiment the IOSetRemoteReferences function call replaces particular parts of remote (i.e., ones located on another node) references specified in the form of "AccessName"."ItemName"—where the ItemName can comprise further extensions delimited, by way of example, by a period. In the exemplary embodiment wherein a reference has multiple parts, multiple parts of the reference must match each of a corresponding set of strings before designated string substitutions are performed within the reference. In a particular exemplary embodiment, the IOSetRemoteReferences function call supports a two-part matching criterion and is specified in the form:

IOSetRemoteReferences (BaseAccess, NewAccess, MatchString, SubstituteString, Mode).

BaseAccess: specifies the originally configured access name to find/match in the references contained within the script in association with a first part of a potentially two-part matching test (see second part below). The BaseAccess can specify a universal access name (e.g., "Galaxy"—that refers to a global address comprising potentially multiple nodes in a network), or alternatively, a particular entity (e.g., TagServer_1). The BaseAccess field cannot be empty.

NewAccess: specifies an access name replacing the originally configured access name string when all matching criteria have been met. The field NewAccess field can be empty. If the NewAccess field is empty, then no string substitution occurs in the AccessName portion of a reference.

MatchString: specifies a string to match in the originally configured item name portion of a reference. The MatchString field can be empty. In the case of an empty MatchString field, any string within a reference is considered a match.

SubstituteString: specifies a string to substitute in the item name portion of a reference if the BaseAccess string and MatchString string are matched for a reference. The SubstituteString field can be empty. If the SubstituteString field is empty, then no substitution occurs with regard to the item name portion of a reference.

Mode: specifies a way in which matching of the "MatchString" occurs (whole/partial field matching) with regard to the content of the item name portion of a reference. In an embodiment of the invention, matching always begins at the beginning of the item name string of a reference. However, the entire item name need not match the specified MatchString. The Mode parameter specifies either "whole string" matching or "partial string" matching. "Whole string" requires matching the MatchString parameter value to the entire item name (between name delimiters such as period or either end) of a reference to constitute a "match." "Partial string" requires matching the MatchString parameter value to only a beginning part of the item name portion of a reference to constitute a match. In the case of the "Partial string" mode only the matched portion of the item name is replaced by the SubstituteString parameter value (string). Thus, the extent of replacing text is potentially a full item name, or some portion of text starting at the beginning at a designated point within the string anywhere and running to the end of the string of an item name and ending at a designated point determined by the content of the specified MatchString parameter. In an alternative embodiment supporting partial string replacements, matching occurs from some midpoint and runs to the end of the string. For example, for everywhere "motor_x.pv" appears in the application or active/open windows script, it could have the "tor_x.pv" portion replaced by "ped23.value", resulting in reference strings ending in "moped23.value" instead of "motor_x.pv". In yet other embodiments the SubstituteString replaces the MatchString regardless of its position within an Item Name. Other matching/replacement schemes are utilized in yet other embodiments of the invention.

In summary the IOSetRemoteReferences function performs whole/partial string substitutions on remote references for which all portions (e.g., Access and Item names) are matched to specified string values (left blank if no match is required). The IOSetRemoteReference function is specified within a script associated with a visualization application, and is applied only to open windows in the application. Thus, the IOSetRemoteReference function potentially affects all remote references within all open windows in a visualization application containing the IOSetRemoteReference function call.

Figure 10:
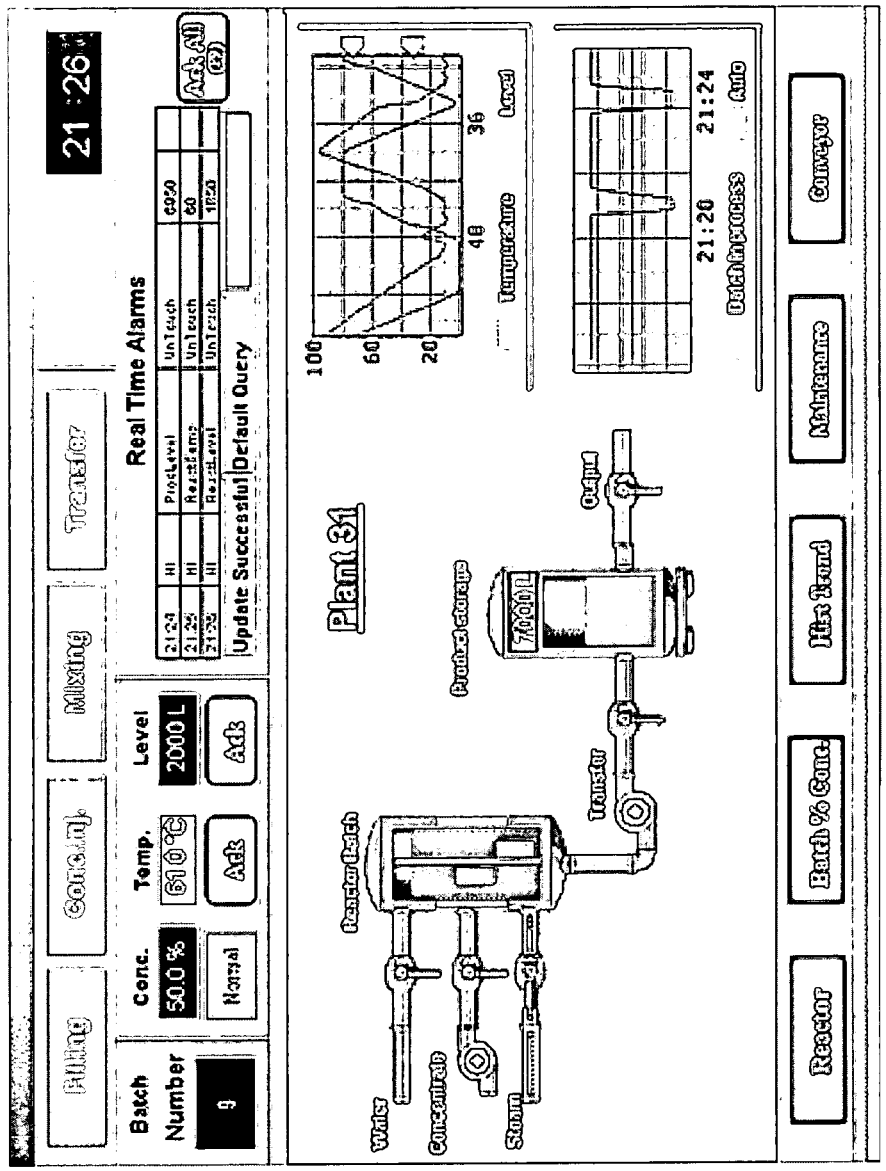
FIG. 10 is an exemplary visualization application window including graphical symbols potentially defined in a design environment embodying the present invention.

Having described an exemplary visualization design environment and a new runtime script function that modifies references within open visualization application windows, attention is directed to FIG. 10 that depicts an exemplary visualization application window including a set of graphical symbols created from the above-described symbol templates. The animation behavior of symbol instances within a view can take on any of a variety of forms, including visual changes (e.g., blinking, movement, size change, rotation, fading, etc.) related to real-time data values provided by referenced application object attributes incorporated into animation expressions specified for the symbol instances. In FIG. 10, such animation is embodied in a dynamic depiction of level in a Product storage tank (by a digital value as well as a graphical rectangle that changes size to correspond to the percentage of the tank filled with liquid. Animation is also incorporated in the form of handle positions in input and output valves to the Product storage tank. A Reactor Batch vessel symbol instance includes two animation behaviors: (1) a fill level and (2) a rotating mixer/agitator assembly. Each portion of the illustrative application view/template set forth in FIG. 10 is potentially provided by a symbol instance created from a symbol template described herein above.

In view of the many possible embodiments to which the principles of this invention may be applied, it should be recognized that the embodiments described herein with respect to the drawing figures are meant to be illustrative only and should not be taken as limiting the scope of the invention. Furthermore, the illustrative steps may be modified, supplemented and/or reordered without deviating from the invention. Therefore, the invention as described herein contemplates all such embodiments as may come within the scope of the following claims and equivalents thereof.

What is claimed is:

1. A programmed computer system for designing animated visualization interfaces including associations between graphical symbols and components of a process control system application, the system including:
    a processor;
    a graphical symbol library for maintaining a set of graphical symbol templates wherein the graphical symbol templates each comprise:
        a graphics definition including graphics data for generating a graphical symbol, and
        a reference to an application component data source type, the reference facilitating identifying candidate application components for creating an association between a graphical symbol instance created from a graphical symbol template and one of the candidate application components; and
    a graphical symbol design environment including a visualization interface design tool facilitating:
        designating the graphical symbol template, from the graphical symbol library, from which the graphical symbol instance is created,
        specifying an application component corresponding to the reference to an application component data source type, and
        creating an association between the graphical symbol instance and the specified application component, wherein the association facilitates providing data from the application component for driving an animation characteristic of the graphical symbol instance.

2. The system of claim 1 wherein the graphical symbol design environment includes a graphical symbol template design tool facilitating creating the graphical symbol template.

3. The system of claim 1 wherein the graphical symbol library includes a container including a set of graphical symbol template folders, wherein a folder name for a template folder identifies an application component data source type suitable for providing data to graphical symbol instances created from graphical symbol templates stored within the template folder.

4. The system of claim 3 wherein the folder name specifies an application object template.

5. The system of claim 2 wherein parent-child associations are maintained between graphical symbol templates and graphical symbol instances created from the graphical symbol templates.

6. The system of claim 5 wherein the graphical symbol template design tool includes a template editor for modifying a graphical symbol template stored in the graphical symbol library, and changes by the template editor are propagated, based upon the parent-child associations, to graphical symbol instances created from the changed graphical symbol template.

7. The system of claim 6 wherein changes to graphical symbol templates are propagated to runtime graphical symbol instances created from the templates.

8. The system of claim 5 wherein the parent-child relationship between a graphical symbol template and a graphical symbol instance is identified by a unique ID assigned to each child graphical symbol instance created from the graphical symbol template.

9. The system of claim 1 wherein the application components comprise sources of information relating to a process control system.

10. The system of claim 1 wherein the association between the graphical symbol instance and at least one application component supports communicating data between a remotely located application component and the graphical symbol instance.

11. The system of claim 1 wherein the graphical design environment stores symbol templates within the graphical symbol library within application-specific containers.

12. The system of claim 1 wherein the visualization interface design tool includes a search utility for providing, based upon the designated graphical symbol template, a list of candidate application components.

13. The system of claim 12 wherein the visualization interface design tool replaces, based upon specifying the application component from the list of candidate application components, placeholder values within the designated graphical symbol templates by application component-specific values, thereby creating the association between the graphical symbol instance and the specified application component.

14. The system of claim 1 further comprising a symbol template recovery tool that regenerates a graphical symbol template from information provided by a child graphical symbol instance created from the graphical symbol template.

15. The system of claim 1 further comprising a script function facilitating replacing, at runtime, a data source name specified by a graphical symbol instance within a visualization application.

16. The system of claim 15 wherein the script function specifies a target text string and a source text string that is added wherever the target text string is encountered while carrying out the script function upon a set of candidate graphical symbol instances.

17. A method for designing animated visualization interfaces including associations between graphical symbols and components of process control system application, the method comprising the steps of:
    maintaining, within a graphical symbol library, a set of graphical symbol templates wherein the graphical symbol templates each comprise:
        a graphics definition including graphics data for generating a graphical symbol, and
        a reference to an application component data source type, the reference facilitating identifying candidate application components for creating an association between a graphical symbol instance created from a graphical symbol template and one of the candidate application components;
    designating the graphical symbol template, from the graphical symbol library, from which the graphical symbol instance is created;
    specifying an application component corresponding to the reference to an application component data source type; and
    creating an association between the graphical symbol instance and the specified application component, wherein the association facilitates providing data from the application component for driving an animation characteristic of the graphical symbol instance.

18. The method of claim 17 wherein parent-child associations are maintained between graphical symbol templates and graphical symbol instances created from the graphical symbol templates.

19. The method of claim 17 further comprising storing symbol templates within the graphical symbol library within application-specific containers.

20. The method of claim 17 providing, based upon the designated graphical symbol template, a list of candidate application components.

21. The method of claim 20 further comprising replacing, based upon specifying the application component from the list of candidate application components, placeholder values within the designated graphical symbol templates by application component-specific values, thereby creating the association between the graphical symbol instance and the specified application component.

22. The method of claim 17 further comprising regenerating, through a symbol template recovery tool, a graphical symbol template from information provided by a child graphical symbol instance created from the graphical symbol template.

23. The method of claim 17 further comprising replacing, at runtime via a script function, a data source name specified by a graphical symbol instance within a visualization application.

24. The method of claim 23 wherein the script function specifies a target text string and a source text string that is added wherever the target text string is encountered while carrying out the script function upon a set of candidate graphical symbol instances.

25. A non-transitory computer readable medium including computer executable instructions for facilitating designing animated visualization interfaces including associations between graphical symbols and components of a process control system application, the computer executable instructions facilitating carrying out the steps of:

maintaining, within a graphical symbol library, a set of graphical symbol templates wherein the graphical symbol templates each comprise:

a graphics definition including graphics data for generating a graphical symbol, and a reference to an application component data source type, the reference facilitating identifying candidate application components for creating an association between a graphical symbol instance created from a graphical symbol template and one of the candidate application components;

designating the graphical symbol template, from the graphical symbol library, from which the graphical symbol instance is created;

specifying an application component corresponding to the reference to an application component data source type; and creating an association between the graphical symbol instance and the specified application component, wherein the association facilitates providing data from the application component for driving an animation characteristic of the graphical symbol instance.

26. The computer readable medium of claim 25 further comprising computer-executable instructions facilitating providing, based upon the designated graphical symbol template, a list of candidate application components.

27. The computer readable medium of claim 26 further comprising computer-executable instructions facilitating replacing, based upon specifying the application component from the list of candidate application components, placeholder values within the designated graphical symbol templates by application component-specific values, thereby creating the association between the graphical symbol instance and the specified application component.

28. A programmed computer system for designing animated visualization interfaces including associations between graphical symbols and components of a process control system application, the system including:

a processor;

a graphical symbol library for maintaining a set of graphical symbol templates wherein the graphical symbol templates each comprise:

a graphics definition including graphics data for generating a graphical symbol, and a reference to an application component data source type, the reference facilitating identifying candidate application components for creating an association between a graphical symbol instance created from a graphical symbol template and one of the candidate application components; and a graphical symbol design environment including a graphical symbol template design tool facilitating creating and storing the graphical symbol templates within a set of visualization application-specific containers within the graphical symbol library.

* * * * *